US010009589B2

(12) United States Patent
Wu (10) Patent No.: US 10,009,589 B2
(45) Date of Patent: Jun. 26, 2018

(54) SMALL-SPACING PRE-MAINTENANCE LED DISPLAY SCREEN

(71) Applicant: Shenzhen Chip Optech Co. Ltd., Shenzhen (CN)

(72) Inventor: Xiaogang Wu, Shenzhen (CN)

(*) Notice: Subject to any disclaimer, the term of this patent is extended or adjusted under 35 U.S.C. 154(b) by 87 days.

(21) Appl. No.: 15/098,140

(22) Filed: Apr. 13, 2016

(65) Prior Publication Data

US 2016/0348854 A1 Dec. 1, 2016

(30) Foreign Application Priority Data

Jun. 1, 2015 (CN) .......................... 2015 1 0290662

(51) Int. Cl.
| | |
|---|---|
| F21V 21/00 | (2006.01) |
| H04N 13/00 | (2018.01) |
| G09F 13/00 | (2006.01) |
| G09F 9/302 | (2006.01) |
| G09F 9/33 | (2006.01) |

(52) U.S. Cl.
CPC ............ *H04N 13/00* (2013.01); *G09F 9/3026* (2013.01); *G09F 9/33* (2013.01); *G09F 13/00* (2013.01)

(58) Field of Classification Search
CPC .... F21V 21/096; F21V 21/0965; G09F 13/00; G09F 9/3026; G09F 9/33; H04N 13/00
See application file for complete search history.

(56) References Cited

U.S. PATENT DOCUMENTS

| | | | | |
|---|---|---|---|---|
| 5,394,658 | A * | 3/1995 | Schreiner | A47B 21/06 312/196 |
| 7,334,361 | B2 * | 2/2008 | Schrimpf | G09F 9/33 16/288 |
| 7,658,504 | B2 * | 2/2010 | Moriyasu | G02F 1/133603 349/69 |
| 9,326,620 | B1 * | 5/2016 | Cross | A47F 3/001 |
| 9,739,462 | B2 * | 8/2017 | Georgitsis | F21V 5/007 |
| 2007/0000849 | A1 * | 1/2007 | Lutz | G09F 9/33 211/26 |
| 2009/0046457 | A1 * | 2/2009 | Everhart | F21V 23/009 362/235 |
| 2009/0116218 | A1 * | 5/2009 | Liu | F21V 14/00 362/84 |
| 2013/0144584 | A1 * | 6/2013 | Chen | G06F 19/3456 703/11 |
| 2014/0085864 | A1 * | 3/2014 | Wu | G09F 9/33 362/97.1 |
| 2017/0054315 | A1 * | 2/2017 | Chien | F21S 8/035 |

* cited by examiner

*Primary Examiner* — Ali Alavi
(74) *Attorney, Agent, or Firm* — Novoclaims Patent Services LLC; Mei Lin Wong (57) ABSTRACT

The invention relates to a small-spacing pre-maintenance LED display screen, the LED display screen comprises a box, a plurality of LED modules and inter-display-screen connecting units provided in the box, the LED display screen comprises connecting ends provided on the lateral sides of the box, and the connecting ends are used to connect any two boxes adjacent to each other.

5 Claims, 6 Drawing Sheets

SMALL-SPACING PRE-MAINTENANCE LED DISPLAY SCREEN

TECHNICAL FIELD

The present invention relates to a LED display screen, especially to a LED display screen composed of a box, a plurality of LED modules and display screen connecting units provided in the box. The LED display screen comprises connecting ends provided on the lateral sides of the box, and the connecting ends are used to connect any two boxes adjacent to each other. Any two boxes can be connected by the connecting ends which are positioned adjacent to each other from left to right or up to down. When the plurality of LED display screens are connected together by the connecting ends, a large LED display screen which can be expanded with no limited is formed.

BACKGROUND ART

As is well known, only larger LED display screen can meet the requirements of people in some special place. In this case, all larger LED display screen are assembled by plurality of LED modules. In fact, the plurality of LED modules are fixed on the whole frame of the LED display screen respectively to form a larger LED display screen by assembling plurality of LED modules, and conventional LED modules are fixed by fixed connecting members such as screws. In such manner, the later maintenance and the replacing of the modules will be difficult. In addition, with the improving requirements of the resolving power of LED, the spacing of light source arranged on the LED modules is smaller and smaller, so the small spacing LED modules have no space for arrangement of the connecting members, such as screws. Conventional structure and design do not adapt to the producing of small spacing LED display screen, and this if the disadvantage of the conventional technology.

SUMMARY OF THE INVENTION

The technical solution of the present invention is providing a small-spacing pre-maintenance LED display screen comprising a box, a plurality of LED modules and display screen connecting units. Wherein, the box is provided with a front face, a back face and a side face connected between the front face and the back face in a surrounding mode. The LED modules are arranged on the front face, and the LED modules are spliced together with one another to form an LED display surface. The connecting units are arranged in the box body and provided with connecting ends dispersedly arranged on the side face of the box, and the connecting ends are used for establishing the connection relation between any two adjacent boxes. The connecting ends enable two up-down adjacent boxes or two left-right adjacent boxes to be tightly connected together. When a plurality of LED display screens are connected together through the connecting ends, a large LED display screen with the display surface capable of being expanded infinitely can be formed.

The box is provided with plurality of box magnetic elements. Each LED module is provided with module magnetic elements on the back. The plurality of LED modules are magnetized on the front face of the box by the box magnetic elements and module magnetic elements corresponding to each other. Each LED modules is provided with detachment magnetic elements corresponding to magnetic detachment assistors producing magnetic suction to the elements. Worker uses the magnetic detachment assistors by hand to get close to the corresponding LED modules, then, the LED modules and the assistors are connected together by the magnetic suction acted on the detachment magnetic elements by the assistors. At the same time, the worker applies a external pull force on the magnetic detachment assistors, and this force can overcomes the magnetic suction acted on the module magnetic unit by the box magnetic unit, furthermore, the connecting between the magnetic units and is broken, so the LED modules can be removed from the box.

The display connecting unit is a movable connecting rod. The connecting ends are arranged respectively on the two ends of the rod. When the movable connecting rod moves, the connecting ends provided on the two ends of the rod move simultaneously, therefore, any two adjacent boxes are connected together. The connecting end provided on one end of the movable connecting rod is a moving outward end, while the connecting end provided on the other end of the rod is a moving inward end. When the movable connecting rod moves by force, the moving outward end extends out from the side face of the box and forms an extending part, at the same time, the moving inward end retracted into the side face of the box and forms a retracting part. The extending part of one LED display screen is inserted in to the retracting part of another LED display screen to be connected together.

The side face of the box is provided with a moving outward end holding hole and a moving inward end holding hole arranged correspondingly on two sides of the box. The moving outward end is arranged in the holding hole. The moving inward end is arranged in the holding hole. The moving outward end comprises an extending connecting head. The moving inward end comprises a retracting head. A fixing structure is arranged in the moving inward end holding hole. When the movable connecting rod moves by force, the extending connecting head extends out from the holding hole and forms the extending part. The retracting head retracts in to the holding hole and forms the retracting part. The fixing structure is provided in the retracting part. The moving outward end holding hole of a LED display screen inserts into the fixing structure of another LED, so the two LED display screens are connected together.

The extending connecting head is provided with external thread, while the fixing structure is provided with internal thread provided on the inner face of the retracting end holding hole.

The retracting head is provided with an inner rotating hole, so the worker can insert the tool such as rocket screwdriver into the hole and rotates the tool, then the movable connecting rod can be rotated and move forward or backward by the inner thread and internal thread.

DETAILED DESCRIPTION OF THE INVENTION

As shown in FIGS. 1 to 11, a small-spacing pre-maintenance LED display screen comprising a box 10, a plurality of LED modules 20 and display screen connecting units 30. Wherein, the box 10 is provided with a front face 11, a back face 12 and a side face 13 connected between the front face 11 and the back face 12 in a surrounding manner.

The plurality of LED modules 20 are arranged on the front face 11 of the box, and spliced together with one another to form a LED display surface. The LED display screen emits light in operation, and send out image information by the LED display surface.

The display screen connecting units 30 are arranged in the box body 10 and provided with connecting ends 40 dispersedly arranged on the side face 13 of the box 10.

The connecting ends 40 are used for establishing the connection relation between any two adjacent boxes 10.

In other words, two up-down or left-right adjacent boxes 10 can be connected tightly by the connecting ends 40. When a plurality of LED display screens are connected together through the connecting ends 40, a large LED display screen with a display surface capable of being expanded infinitely can be formed.

The plurality of connecting ends 40 are dispersedly arranged on the side face 13 of the box 10, therefore, the workers do not need do enter into the larger LED display screen, but only need to stand on the front face of the larger LED display screen to finish the assembling of the larger LED display screen or the maintenance or replacement of the box by operating the connecting ends 40 provided on the side face 13 of the box 10.

The technical solution of the present invention can greatly reduce the floor space of the larger LED display screen, and improve the efficiency of elevating, mounting and maintenance at the same time.

The box 10 is provided with plurality of box magnetic elements 51. Each LED module 20 is provided with module magnetic elements 52 on the back.

The plurality of LED modules 20 are magnetized on the front face 11 of the box by the box magnetic elements 51 and module magnetic elements 52 corresponding to each other.

Each LED modules 20 is provided with detachment magnetic elements 53 corresponding to magnetic detachment assistors 54 producing magnetic suction to the elements 53.

Worker uses the magnetic detachment assistors 54 by hand to get close to the corresponding LED modules 20, then, the LED modules 20 and the assistors 54 are connected together by the magnetic suction acted on the detachment magnetic elements by the assistors 54. At the same time, the worker applies a outward pull force on the magnetic detachment assistors 54, and this force can overcomes the magnetic suction acted on the module magnetic unit 52 by the box magnetic unit 51, furthermore, the connecting between the magnetic units 51 and 52 is broken, so the LED modules 20 can be removed from the box 10, and convenient for the subsequent replacement, check and maintenance.

To improve resolving power of LED display screen, the spacing of light source arranged on the LED modules is normally less than 2.0 mm, so there in no space on the LED modules for other connecting devices and detaching devices. The inventor of this invention gets the method of mounting and detaching the modules magnetic units by years of practice and research.

The LED display screen gotten by the assembling and detaching manner of the module magnetic elements and the technical solution that plurality of modules 10 are dispersedly arranged on the side face 13 of the box 10 enable the workers to stand on the front face of the screen to finish the assembling, detaching, maintain and replacing of the boxes or modules.

Figure 5:
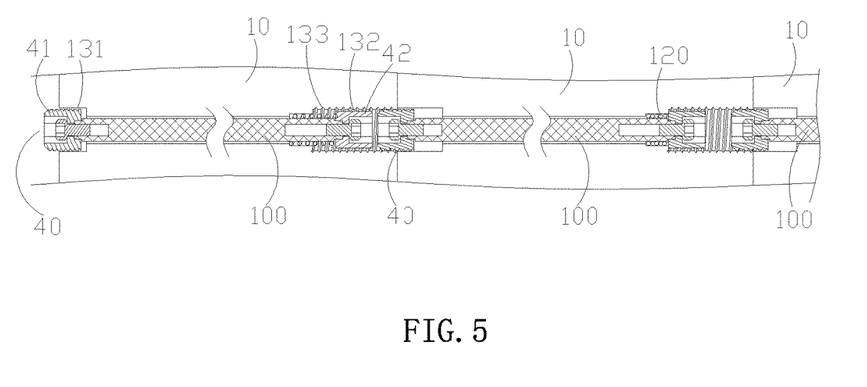
FIG. 5 is a cross section of the display screen connecting units of the invention.
Figure 6:
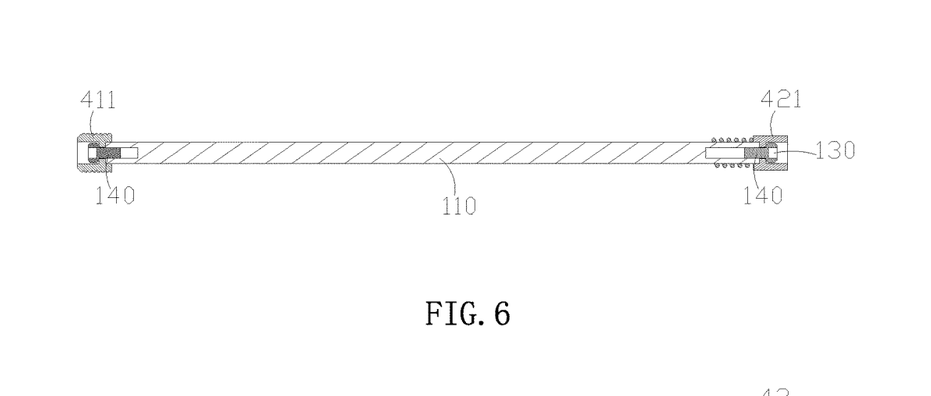
FIG. 6 is a cross section of the fixed-length rod of the invention.
Figure 7:
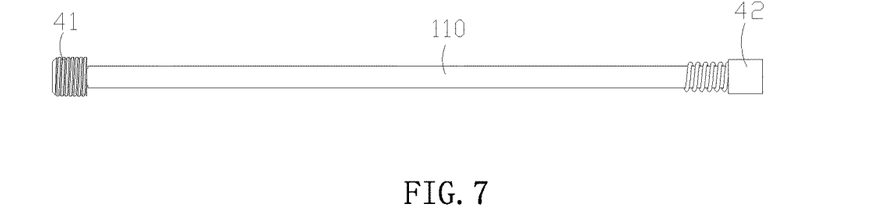
FIG. 7 is a front vies of the fixed-length rod of the invention.

As shown in FIGS. 5-7, the display connecting unit 30 is a movable connecting rod 100. The connecting ends 40 are provided respectively on the two ends of the rod 100.

When the movable connecting rod 100 moves, the connecting ends 40 provided on the two ends of the rod 100 move simultaneously, therefore, any two adjacent boxes 10 are connected together.

The connecting end 40 provided on one end of the movable connecting rod 100 is a moving outward end 41, while the connecting end 40 provided on the other end of the rod 100 is a moving inward end 42.

When the movable connecting rod 100 moves by force, the moving outward end 41 extends out from the side face 13 of the box and forms an extending part, at the same time, the moving inward end 42 retracted into the side face 13 of the box and forms a retracting part.

The extending part of one LED display screen is inserted in to the retracting part of another LED display screen to be connected together.

In the implementation, the movable connecting rod 100 comprises a fixed length rod 110.

The moving outward end 41 and the moving inward end 42 are provided respectively on the two ends of the fixed length rod 100.

The length of the fixed length rod 110 is fixed, so the moving inward end 42 must retracts into the side face 13 of the box and forms a retracting part, when the moving outward end 41 extends outwardly from the side face 13 and forms an extending part.

In the implementation, the fixed length rod 110 is a set of rod group driven by driving motor. When the driving device is in operation, the rod group drives the moving outward end 41 to extend out from the side face 13 to form the extending part. At the same time, the moving inward end 42 retracts into the side face 13 and forms the retracting part.

In the implementation, the movable connecting rod 100 is arranged parallel to the front face 11 of the box, so the box 10 can be thinned and the thickness of the box 10 can be reduced.

Figure 9:
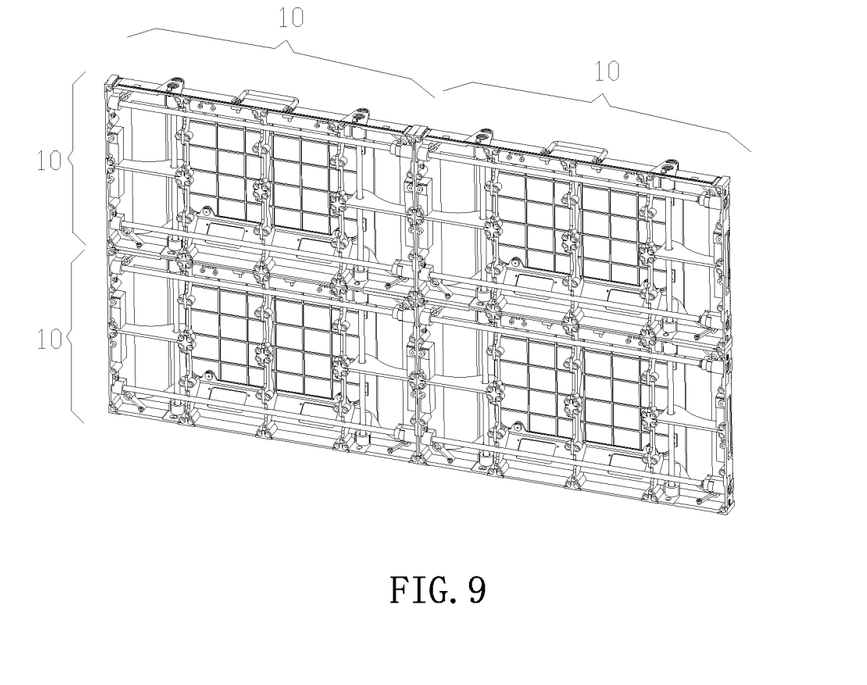
FIG. 9 is a cross section of the connecting of the plurality of boxes of the invention.

The side face 13 of the box is provided with a moving outward end holding hole 131 and a moving inward end holding hole 132 arranged correspondingly on two sides of the box 10.

The moving outward end 41 is arranged in the holding hole 131. The moving inward end 42 is arranged in the holding hole 132.

The moving outward end comprises an extending connecting head 411. The moving inward end 42 comprises a retracting head 421. A fixing structure 133 is provided in the moving inward end holding hole 132.

When the movable connecting rod 100 moves by force, the extending connecting head 411 extends out from the holding hole 131 and forms the extending part.

The retracting head 421 retracts in to the holding hole 132 and forms the retracting part. The fixing structure 133 is provided in the retracting part.

The moving outward end holding hole 131 of a LED display screen inserts into the fixing structure 133 of another LED, so the two LED display screens are connected together.

In the implementation, the extending connecting head 411 is provided with external thread, while the fixing structure 133 is provided with internal thread provided on the inner face of the retracting end holding hole 132.

To improve operation convenience, the movable connecting rod 100 is provided with a spring 120 on one end, and can automatic reset by the elastic restoring force of the spring 120.

The retracting head 421 is provided with an inner rotating hole 130. In the implementation, the worker can insert the tool such as rocket screwdriver into the hole 130 and rotates the tool, then the movable connecting rod 100 can be rotated and move forward or backward by the inner thread and internal thread.

The extending connecting head 411 can also be provided with an inner rotating hole 130.

In the implementation, the extending connecting head 411 and the retracting head 421 are fixed on the two ends of the movable connecting rod 100 by connecting bolts 140. The inner rotating hole 130 is provided on the connecting bolt 140.

Figure 1:
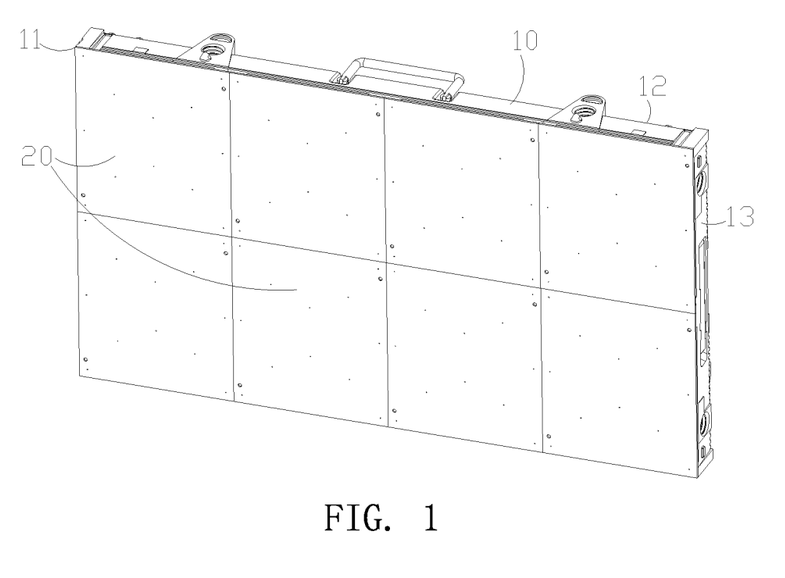
FIG. 1 is a perspective view of the invention.
Figure 2:
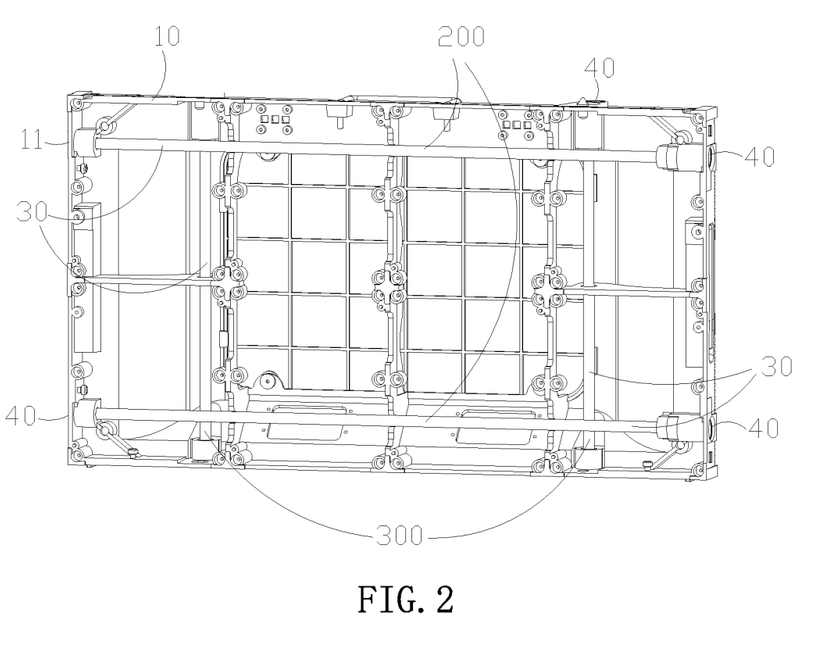
FIG. 2 is a perspective view of the box and the connecting units between the display screens of the invention.
Figure 3:
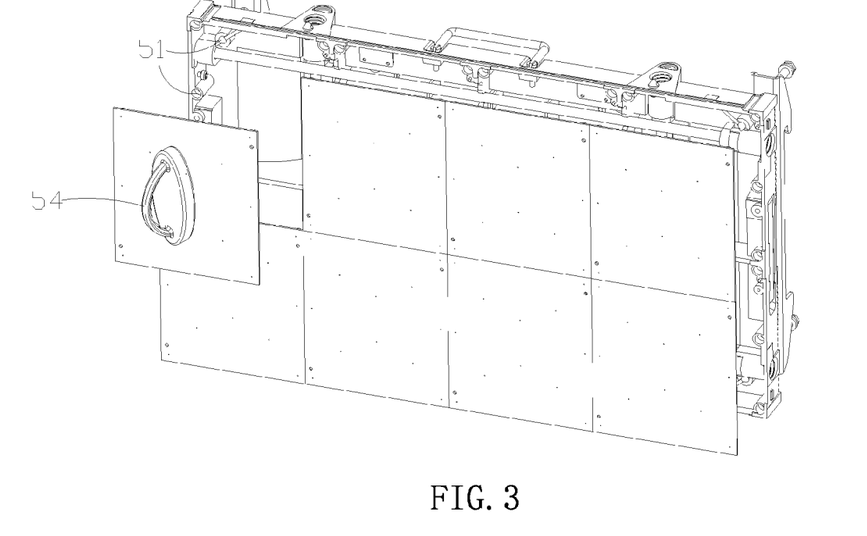
FIG. 3 is a schematic diagram of disassembling of the front face of the LED modules of the invention.
Figure 4:
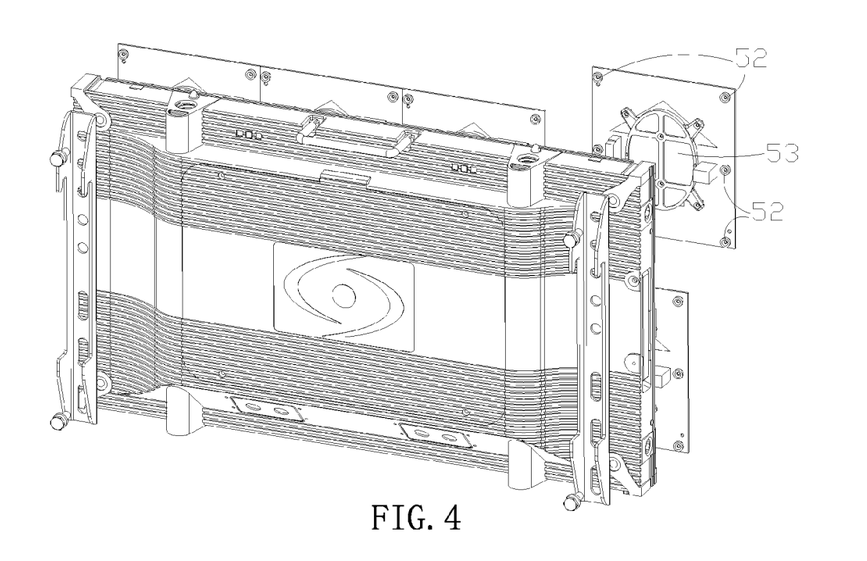
FIG. 4 is a schematic diagram of disassembling of the back face of the LED modules of the invention.

The movable connecting rod 100 is arranged transversely in the box 10 and forms a transverse connecting rod group 200.

The movable connecting rod 100 is arranged longitudinally in the box 10 and forms a longitudinal connecting rod group 300. Wherein, the transverse connecting rod group 200 is used to connect any two adjacent transversely LED display screen. The longitudinal connecting rod group 300 is used to connect any two adjacent longitudinal LED display screen.

In the implementation, the transverse connecting rod group 200 and the longitudinal connecting rod group 300 are respectively composed of plurality of movable connecting rods 100.

The transverse connecting rod group 200 and the longitudinal connecting rod group 300 can operate simultaneously by the linkage device provided there between, and be connected and locked simultaneously.

Figure 8:
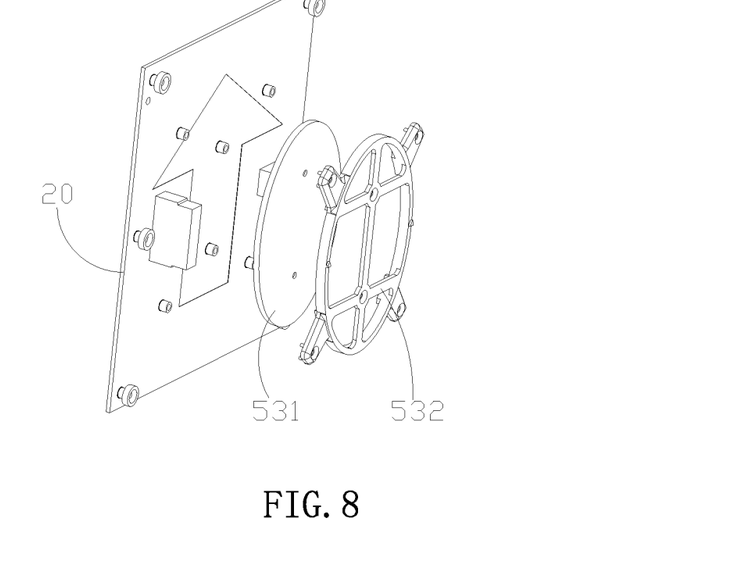
FIG. 8 is an exploded vies of the LED modules of the invention.

Each LED module 20 comprises a shell, a circuit board and LED light sources electrical connected to the circuit board. The circuit board is arranged in the shell. The LED light source emit out from the front face of the shell.

The module magnetic element 52 is composed of plurality of suction blocks. each box magnetic element 51 is composed of plurality of suction holes corresponding to the suction blocks one to one.

In the implementation, the suction blocks and/or holes have magnetism, so the plurality of LED modules 20 is magnetic suctioned on the front face 11 of the box.

Figure 11:
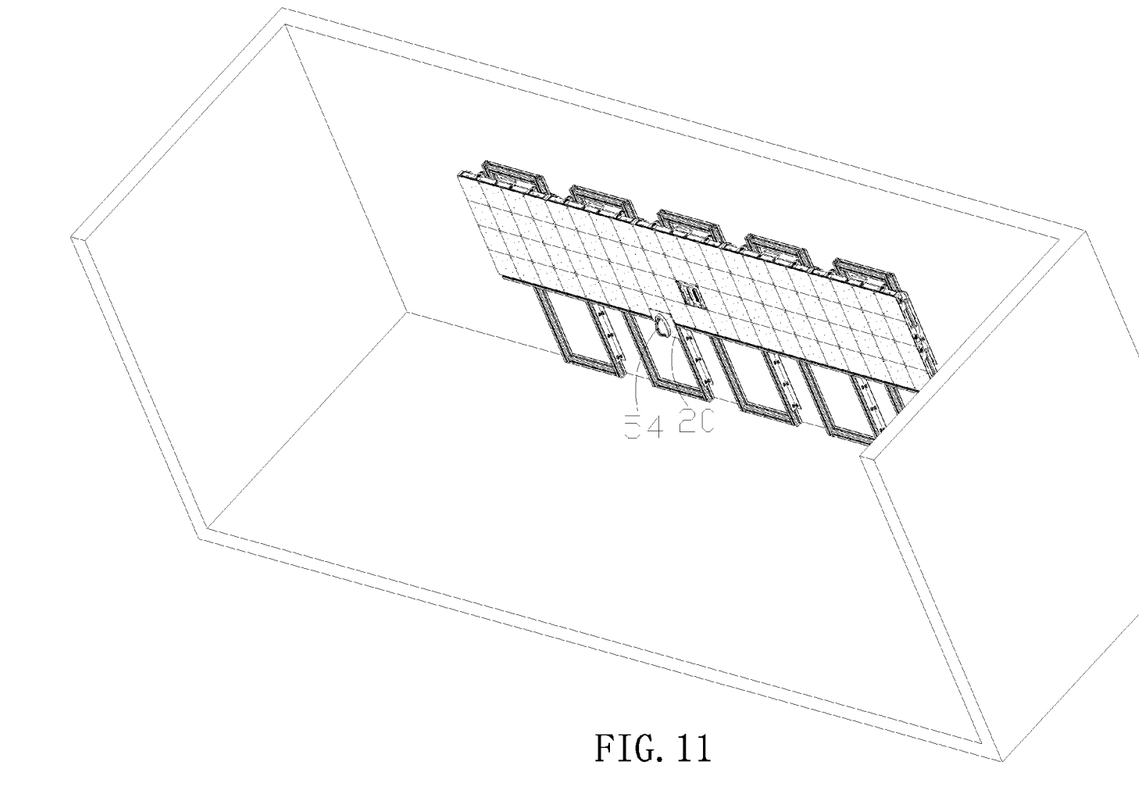
FIG. 11 is a schematic diagram of disassembling of the LED modules of the invention.

The detachment magnetic element 53 comprises magnetic plate 531 and connecting bracket 532 fixing the magnetic plate 531 on the back of the LED modules 20.

The magnetic plate 531 is housed by a plastic housing.

In the implementation, the magnetic plate 531 can have magnetism or not.

The magnetic detachment assistor 54 can be an electromagnet detachment handle.

The present invention is assembled according to the following step:

The first step is assembling the larger LED display screen frame 1.

Figure 10:
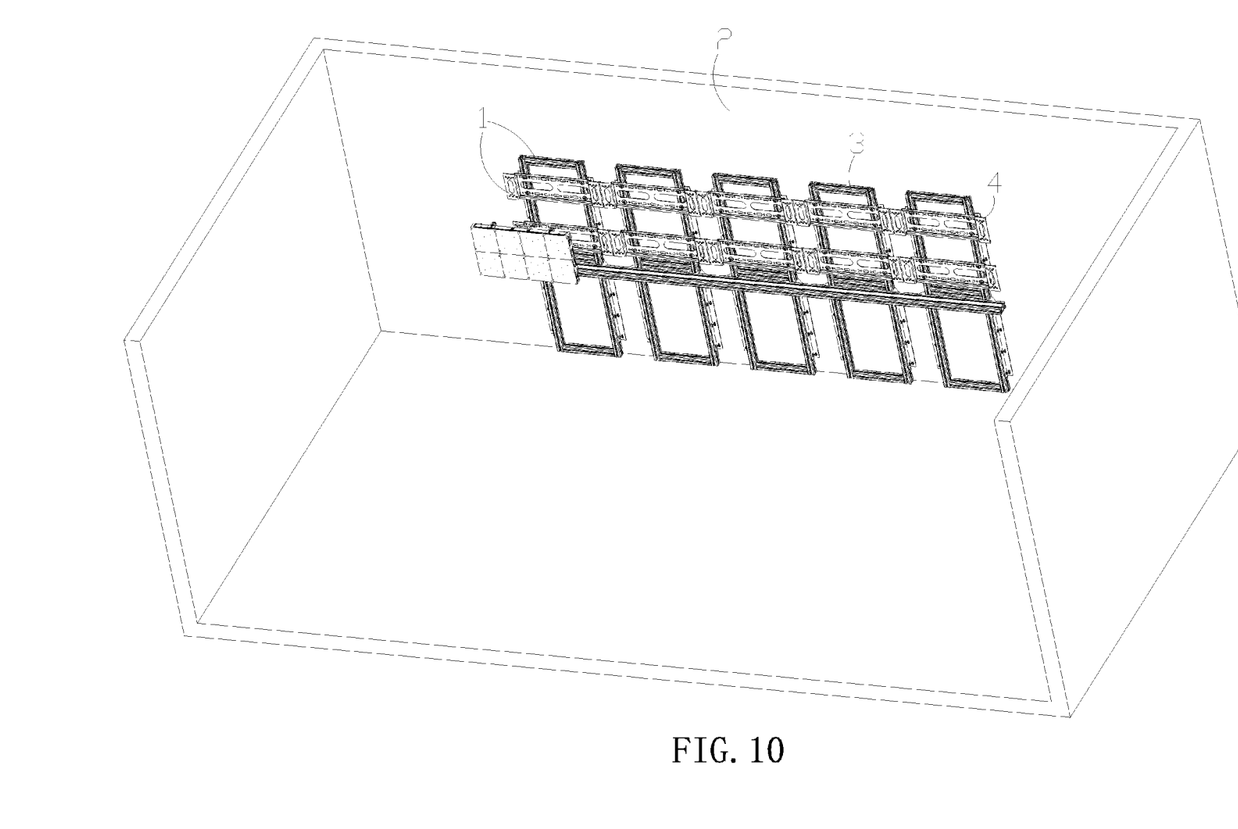
FIG. 10 is a schematic diagram of a larger LED display screen capable of being expanded infinitely of the invention.

The larger LED display screen frame 1 is mounted directly on the support surface 2 which can be wall or other structure surface having supporting function. The larger LED display screen frame 1 comprises a main supporting frame and subframe 4. The main supporting frame 3 is fixed on the supporting surface 2. The subframe 4 is connected between the back face of the LED display screen and the main frame 3.

The second step is assembling the plurality of LED display screens on the frame 1, and connecting any two adjacent LED display screens so as to form a larger integral LED display screen.

Each LED display screen comprises a box 10, plurality of modules 20 and display screen units 30. In the second step, the workers do not need do enter into the larger LED display screen, but only need to stand on the front face of the larger LED display screen to finish the assembling by operating the connecting ends 40 provided on the side face 13 of the box 10. At the same time, the workers can finish the detachment of any box of the LED display screen in the same manner.

What is claimed is:

1. A small-spacing pre-maintenance LED display screen, comprising:
   a box,
   a plurality of LED modules,
   and display screen connecting units,
   wherein, the box is provided with a front face, a back face and a side face connected between the front face and the back face in a surrounding mode, the LED modules are arranged on the front face, and the LED modules are spliced together with one another to form an LED display surface, the connecting units are arranged in the box body and provided with connecting ends dispersedly arranged on the side face of the box, and the connecting ends are used for establishing the connection relation between any two adjacent boxes, the connecting ends enable two up-down adjacent boxes or two left-right adjacent boxes to be tightly connected together, when a plurality of LED display screens are connected together through the connecting ends, a large LED display screen with the display surface capable of being expanded infinitely can be formed,
   wherein, the box is provided with plurality of box magnetic elements, each LED module is provided with module magnetic elements on the back, the plurality of LED modules are magnetized on the front face of the box by the box magnetic elements and module magnetic elements corresponding to each other, each LED modules is provided with detachment magnetic elements corresponding to magnetic detachment assistors producing magnetic suction to the elements, worker uses the magnetic detachment assistors by hand to get close to the corresponding LED modules, then, the LED modules and the assistors are connected together by the magnetic suction acted on the detachment magnetic elements by the assistors, at the same time, the worker applies a external pull force on the magnetic detachment assistors, and this force can overcomes the magnetic suction acted on the module magnetic unit by the box magnetic unit, furthermore, the connecting between the magnetic units and is broken, so the LED modules can be removed from the box.

2. A small-spacing pre-maintenance LED display screen, comprising:

a box, a plurality of LED modules, and display screen connecting units, wherein, the box is provided with a front face, a back face and a side face connected between the front face and the back face in a surrounding mode, the LED modules are arranged on the front face, and the LED modules are spliced together with one another to form an LED display surface, the connecting units are arranged in the box body and provided with connecting ends dispersedly arranged on the side face of the box, and the connecting ends are used for establishing the connection relation between any two adjacent boxes, the connecting ends enable two up-down adjacent boxes or two left-right adjacent boxes to be tightly connected together, when a plurality of LED display screens are connected together through the connecting ends, a large LED display screen with the display surface capable of being expanded infinitely can be formed, wherein, the display connecting unit is a movable connecting rod, the connecting ends are arranged respectively on the two ends of the rod, when the movable connecting rod moves, the connecting ends provided on the two ends of the rod move simultaneously, therefore, any two adjacent boxes are connected together, the connecting end provided on one end of the movable connecting rod is a moving outward end, while the connecting end provided on the other end of the rod is a moving inward end, when the movable connecting rod moves by force, the moving outward end extends out from the side face of the box and forms an extending part, at the same time, the moving inward end retracted into the side face of the box and forms a retracting part, the extending part of one LED display screen is inserted in to the retracting part of another LED display screen to be connected together.

3. A small-spacing pre-maintenance LED display screen according to claim 2, wherein, the side face of the box is provided with a moving outward end holding hole and a moving inward end holding hole arranged correspondingly on two sides of the box, the moving outward end is arranged in the holding hole, the moving inward end is arranged in the holding hole, the moving outward end comprises an extending connecting head, the moving inward end comprises a retracting head, a fixing structure is arranged in the moving inward end holding hole, when the movable connecting rod moves by force, the extending connecting head extends out from the holding hole and forms the extending part, the retracting head retracts in to the holding hole and forms the retracting part, the fixing structure is provided in the retracting part, the moving outward end holding hole of a LED display screen inserts into the fixing structure of another LED, so the two LED display screens are connected together.

4. small-spacing pre-maintenance LED display screen according to claim 3, wherein, the retracting head is provided with an inner rotating hole, so the worker can insert the tool such as rocket screwdriver into the hole and rotates the tool, then the movable connecting rod can be rotated and move forward or backward by the inner thread and internal thread.

5. A small-spacing pre-maintenance LED display screen according to claim 3, wherein, the extending connecting head is provided with external thread, while the fixing structure is provided with internal thread provided on the inner face of the retracting end holding hole.

* * * * *